(12) United States Patent
Picton (10) Patent No.: US 8,667,994 B2
(45) Date of Patent: Mar. 11, 2014

(54) PLUMBING FITTING

(76) Inventor: David John Picton, Auckland (NZ)

( * ) Notice: Subject to any disclaimer, the term of this patent is extended or adjusted under 35 U.S.C. 154(b) by 1431 days.

(21) Appl. No.: 11/794,103

(22) PCT Filed: Dec. 20, 2005

(86) PCT No.: PCT/NZ2005/000335
§ 371 (c)(1),
(2), (4) Date: Apr. 29, 2008

(87) PCT Pub. No.: WO2006/068514
PCT Pub. Date: Jun. 29, 2006

(65) Prior Publication Data
US 2008/0302435 A1   Dec. 11, 2008

(30) Foreign Application Priority Data

Dec. 24, 2004  (NZ) .......................... 537534

(51) Int. Cl.
*F16L 55/00* (2006.01)
(52) U.S. Cl.
USPC ........................... 138/108; 138/106; 138/107
(58) Field of Classification Search
USPC ......................................... 138/106, 107, 108
See application file for complete search history.

(56) References Cited

U.S. PATENT DOCUMENTS

| | | | |
|---|---|---|---|
| 1,824,422 A | 9/1931 | Badger | |
| 2,323,912 A * | 7/1943 | Johnson | 285/334.5 |
| 2,676,037 A * | 4/1954 | Mueller | 285/148.28 |
| 4,138,147 A * | 2/1979 | Manchester et al. | 285/145.1 |
| 4,357,860 A | 11/1982 | Krazak | |
| 5,590,567 A | 1/1997 | Marrs et al. | |
| 6,085,795 A * | 7/2000 | Ogawa et al. | 138/108 |
| 6,260,584 B1 * | 7/2001 | Foti | 138/109 |
| 6,312,020 B1 * | 11/2001 | Ketcham et al. | 285/142.1 |
| 6,595,473 B2 * | 7/2003 | Aoki et al. | 248/74.4 |

FOREIGN PATENT DOCUMENTS

| | | |
|---|---|---|
| DE | 102 48 086 A1 | 6/2004 |
| EP | 1 045 185 A2 | 10/2000 |

OTHER PUBLICATIONS

International Search Report for Application No. PCT/NZ2005/000335; Mailed Sep. 11, 2006.

* cited by examiner

*Primary Examiner* — Steven J Ganey
(74) *Attorney, Agent, or Firm* — Young & Thompson (57) ABSTRACT

A plumbing fitting includes a body portion 1 which is secured to a structure such as a wall framing in use by means of a mounting means 2. An inlet means 3 is linked to an outlet means 4 by means of an internal passage in the body portion. The inlet means is adapted to be secured to distributor pipework or hoses in use and the outlet means is adapted to be coupled to a flexible hose or a tap where it projects through a wall lining. The body portion 1 can slide within the mounting means 2, if sufficient force is used, so that after the coupling is made to an extended outlet means 4 the outlet means can be pushed back towards the wall structure to assist in the provision of a neat appearance.

25 Claims, 12 Drawing Sheets

PLUMBING FITTING

TECHNICAL FIELD

In most plumbing installations, male or female wingback fittings, sometimes called "elbows", are used at the junction of the distributing pipework or tubing in a structure and an outlet position.

Since the co-ordinates of the axis of the outlet frequently need to be quite accurately located on a usually vertical plane such as a wall cladding, some care is necessary to fix the wingback to a noggin, dwang or batten, or sometimes in a notch in a stud, to get the axis location correct and perpendicular to the plane. Usually it is impractical to make much attempt to ensure that the tip of a threaded outlet of a male wingback will project from a structure for the optimum distance. Frequently this is because the plumber does not know at the time the wingback is installed what wall cladding will be used. Thus, after the distribution plumbing is covered in with the wall cladding, it is usually necessary for the length of any male threaded tip to be reduced, usually by hacksawing. Access is not always easy. If the wingback used was a female version then, after the wall cladding is installed, a suitable portion is cut (usually by hacksaw) off an externally threaded brass tube and this is screwed into the wingback together with a suitable sealing tape. By these means the outlet should project a minimal distance beyond the cladding, preserving a neat look when the whole job is finished while leaving enough exposed male thread to enable connection to a tap, the nut of a braided connection hose, or a crox nut and associated rigid or semi-rigid pipe, for example.

The present invention was conceived in order to simplify provision of an acceptable amount of projection of an outlet from a structure whether the outlet be threaded or a hose tail, for example.

DISCLOSURE OF THE INVENTION

The present invention in a first aspect consists in a method of providing an outlet from a distributor in a structure comprising the steps (in any order) of
 (a) securing the distributor to an inlet provided on a body
 (b) suitably securing the body to the structure, and
 (c) slidably adjusting an outlet from the body by movement of at least the outlet along the outlet axis so that it projects, or will project, a desired distance from the structure and (subsequent to step b) restraining the outlet from rotating in at least one direction with respect to the structure in at least its final position.

Preferably the outlet is restrained from rotating in either direction with respect to the structure in any of its possible positions following step (b).

In a second aspect the present invention consists in a plumbing fitting which includes a body portion, mounting means enabling the body portion to be secured to a structure in use, an inlet means for said body portion, an outlet means for said body portion, said outlet means having an axis, a passage through said body portion linking the inlet means to the outlet means, the position of the outlet means being slidable along its axis to any of multiple positions with respect to the mounting means, in use and at any such final position being restrained from relative rotation, in at least one direction, about its axis, between it and the body portion.

DESCRIPTION OF THE DRAWINGS

The present invention will now be described with reference to the accompanying drawings in which.

PREFERRED MODE

Figure 1:
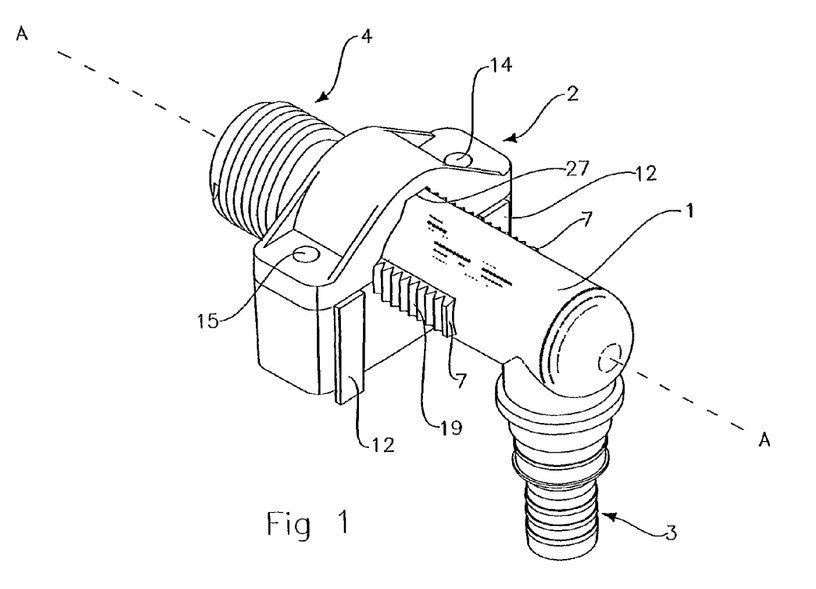
FIG. 1 shows a perspective view from the rear of a preferred fitting.

In the preferred form of the invention as shown in FIG. 1, a plumbing fitting comprises a body 1 which in the illustrated embodiment is shown as an elbow, although it need not necessarily be that shape. Mounting means 2 is adapted to hold the body and is itself adapted to be secured to a usually horizontal support such as a noggin or dwang.

The body 1 is hollow, having a passage through it, so that fluid introduced to the inlet means 3, in use, will flow out of the outlet means 4. The actual form of coupling at the inlet means and outlet means is completely optional and may be a push-fit connection, a clamped connection, or a threaded connection. However the most usual configuration for the outlet means 4 would be either a ½ inch or a ¾ inch BSP male thread. The dotted line A-A represents the axis of the outlet means 4. The extreme end of the outlet means 4 is preferably formed with a 40° internal chamfer adapted to mate with the sealing rib of a cap which forms the subject of one of my patent specifications.

The position of the outlet means 4 is slidable along axis A-A to any of multiple positions with respect to the mounting means 2, in use. While sliding is possible, relative rotation is prevented.

Figure 2:
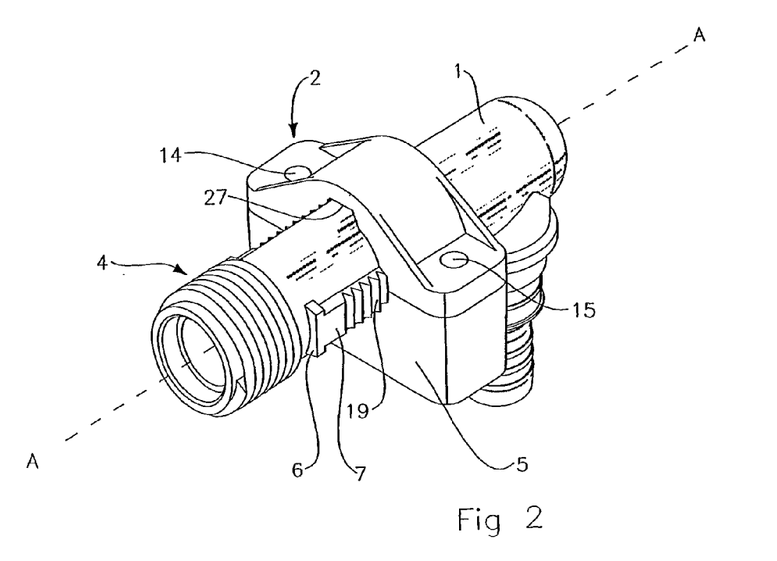
FIG. 2 shows a perspective view from the front of a preferred fitting.
Figure 3:
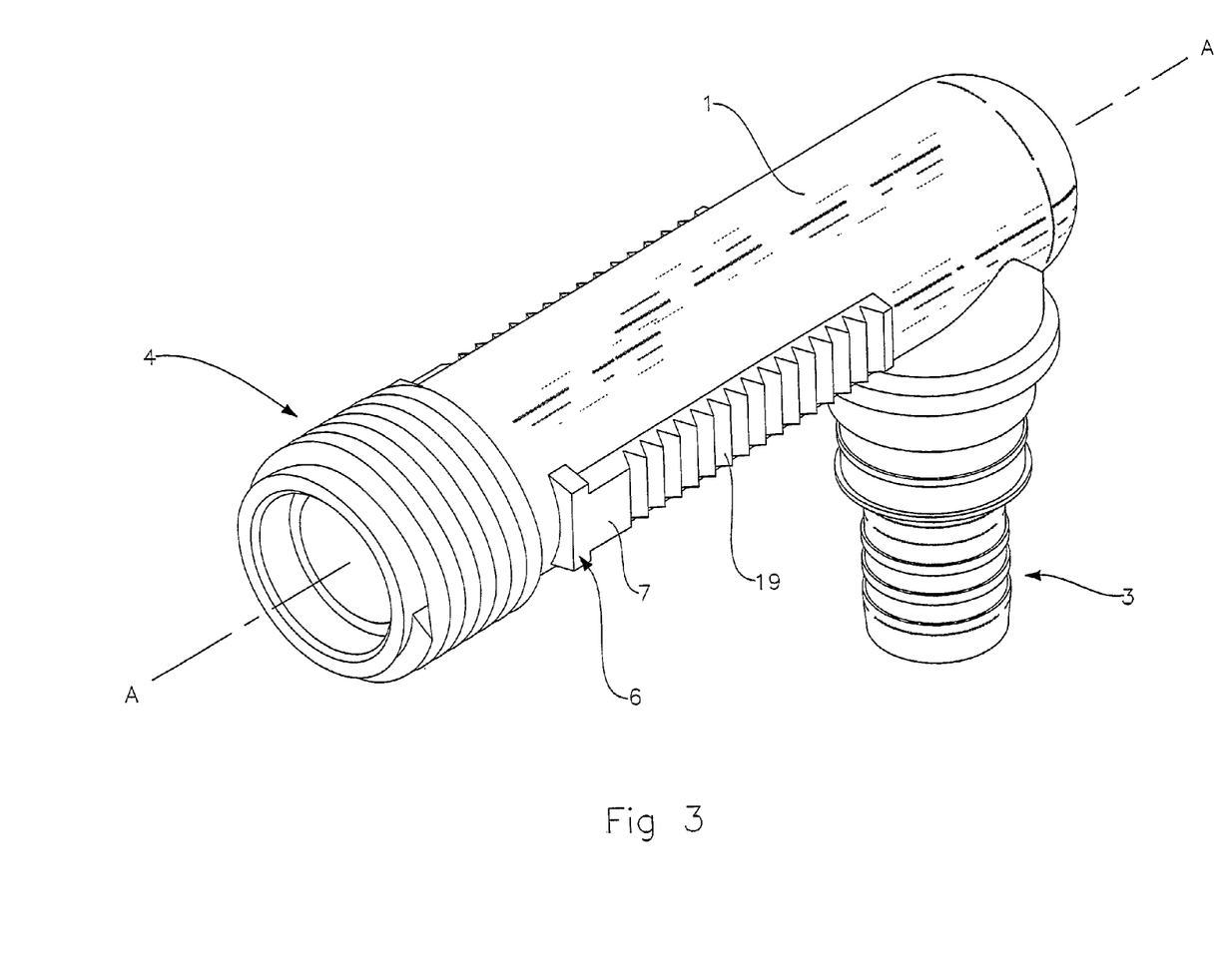
FIG. 3 shows the preferred form of fitting body where the body is shaped as an elbow

The precise means by which all this is facilitated will be described but the advantages are very considerable in terms of the labour saved during a normal plumbing installation in a new home. It has been estimated that as much as three hours of time could be saved in an average case. The mounting means is constructed in such a manner that it is capable of being installed with the face 5 (FIG. 2) flush with, or very close to, any cladding which would be applied to the structure once the plumbing distribution system had been installed. FIG. 2 shows the outlet means in a semi-extended position. The stops such as 6 (provided on each side) limit the inwards position of the outlet means when they come into contact with the face 5. The range of movement of the outlet means 4 from its innermost to outermost position can easily be made to be in excess of 25 mm for a fitting with a ½ inch BSP outlet.

The plumber would normally leave the fitting with the outlet means fully retracted in preparation for the wall lining to be fitted by another trade. After leak testing the installation, it is possible to leave my sealing caps on each outlet prior to the wall linings being applied. This not only keeps foreign matter from entering the plumbing system but also enables the installation to be kept pressurised and the builders to have access to an uncapped but valved temporary outlet within the structure. My caps are easily removed when the time comes to depressurise the installation and to complete it as each fitting is able to be pulled as far as possible from the wall surface prior to cap removal, so any water escaping is easily collected and does not wet the wall lining or the structure itself.

After that had been done and it was the turn to install items such as handbasins, sinks, etc. the outlet means would be at or near its outermost position. A bezel, or escutcheon, or covering ring adapted to conceal the aperture in the cladding through which the body 1 extended would be fitted and then commonly the nut of a flexible hose would be secured to the outlet means 4. Perhaps an in-line shut-off tap might be fitted prior to fitting of the hose and so on.

During the fitting process, the keys 7 provided, one key on each side of the body, in preference as a minimum, would prevent rotation of the body within the mounting means 2 by engaging with a single key way 27 (if just one key 7) or multiple keyways 27 therein. Once the necessary fitments were secured the body 1 would then be pushed back into the mounting means 2 so that it projected from the external cladding surface by the minimum amount. The escutcheon would contact the flexible hose nut, for instance. This then leads to a very satisfactory appearance.

In some instances the fitting could be used to secure a rigid or semi-rigid pipe such as a soft copper pipe, secured by a crox nut to a male threaded outlet means 4, but it will possibly not be very suitable for use with say a tap in the wall above a sink bench without the provision of a means of locking the axial position of the body 1 with respect to the mounting means 2. Ways of doing that will be described subsequently.

Figure 4:
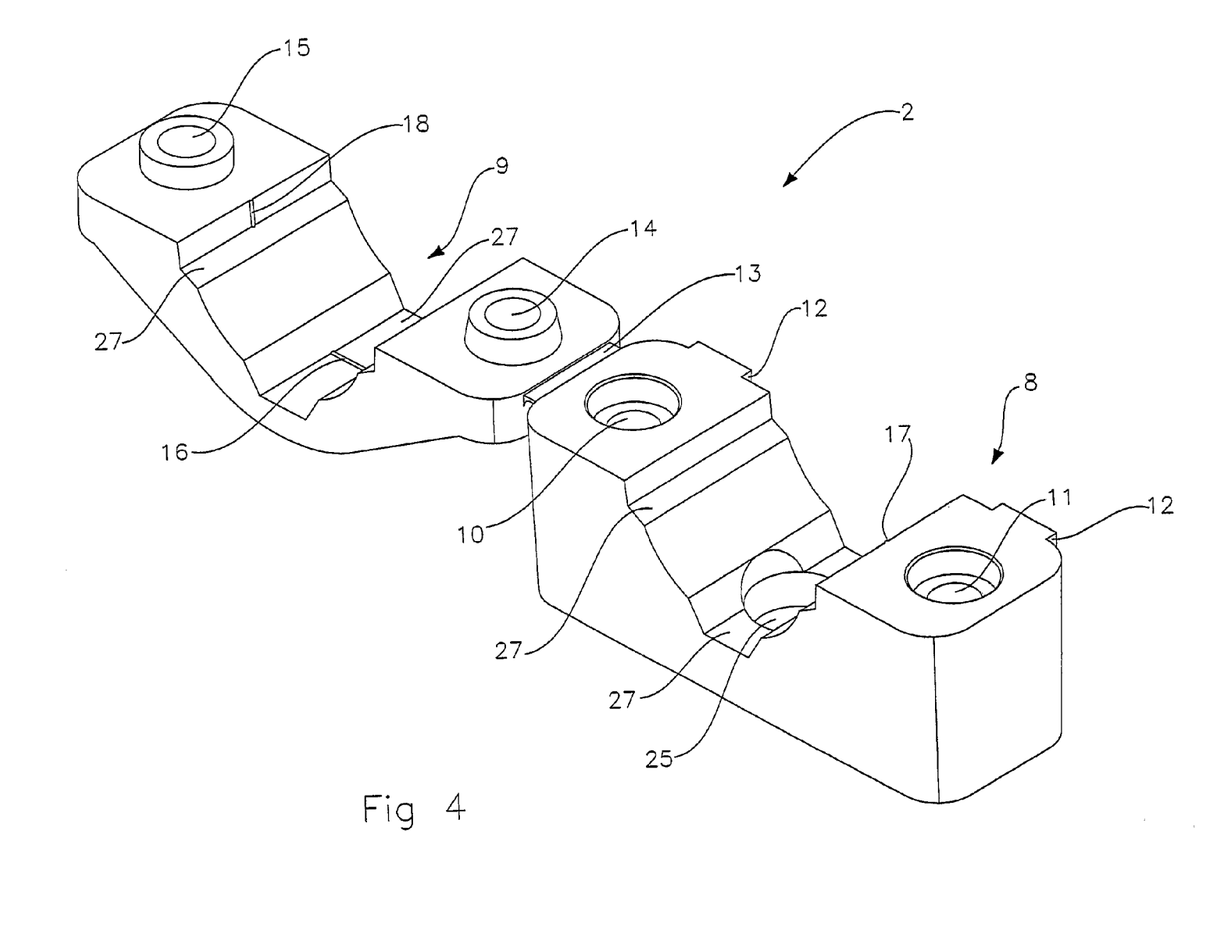
FIG. 4 shows a preferred form of mounting means for fastening onto a dwang or other suitable support structure

Referring now to FIG. 4, the mounting means is preferably provided in two portions, a lower portion 8 and an upper portion 9. The lower portion 8 has three mounting holes in it 25, 10 and 11. A first step in the installation of the mounting means is to utilise the hole 25 and to screw the lower portion 8 to a horizontal locating member which the plumber or builder has provided at the appropriate height. A locating member which considerably simplifies that task is described in one of my patent specifications. A pair of stops such as 12 (FIG. 1), if provided, might assist in the appropriate location of the mounting means which should preferably have its face 5 as close to the internal face of any cladding to be applied to the structure, as is possible.

The upper portion 9 of the mounting means is preferably joined to the lower portion 8 by a narrow bridge 13 of resilient material where the mounting means is injection moulded from a plastics material such as acetal. Once the bottom portion 8 of the mounting means has been appropriately secured in position, so that the outlet axis A-A will have the appropriate co-ordinates, the body 1 is inserted into the mounting means with the required orientation of the inlet means 3, there being four possible in the illustrated embodiment, and then the upper portion 9 is swung over to enclose the body and two screws are passed through holes 14 and 15, and thus into holes 10 and 11 respectively. These screws preferably pass right through the lower portion 8 and into whatever support is underneath the mounting means. Thus, three screws (not shown) in practice hold the mounting means 2 securely in place.

While it is possible to make the tolerances between the body 1 and the mounting means 2 such that the frictional forces between the mounting means and the body provide resistance to sliding movement of the body along the axis A-A, a catch such as catch 16, or catch 17 and 18 (17 and 18 being two halves of the one catch) may be provided in at least two of the preferably four keyways 27 in the mounting means which are at 90° to each other to co-act with the serrations 19 of at least one key 7 so that regardless of which orientation of the body with respect to the mounting means is chosen, there is always one catch such as 16 available to co-act with serrations such as 19 to provide extra resistance to sliding movement along the axis A-A than might be achievable by the use of friction alone. The resilience of the plastics material from which the fitting may be moulded is utilised in this case, and obviously that type of catch would not work for a fitting cast in metal.

While the illustrated embodiment has been described with two keys 7 180° apart on the body, it will be apparent that any number of keys could be provided, where a key is necessary, sufficient to restrain rotation, or any substantial rotation, of the body within the mounting means in the case where the outlet means was threaded so that rotational forces would be encountered (as opposed to say a push-fit type outlet means). The external body cross-sectional shape itself could be square or hexagonal for example, sliding within a suitable square or hexagonal aperture in the mounting means. That arrangement would allow sliding while preventing rotation. There are many options.

Figure 5:
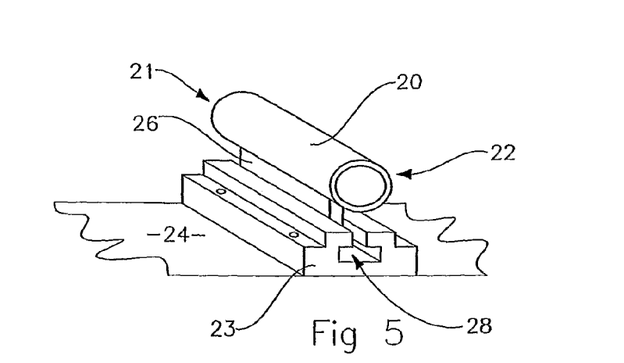
FIG. 5 shows another possible configuration for a fitting according to this invention, FIG. 6 (which is entirely schematic) shows yet another possible configuration of a fitting, and FIG. 7 (which is also schematic) shows a variation of the fitting of FIG. 6 with a positive cam-lock.

FIG. 5 shows a different type of construction altogether but still utilising the sliding principle. In FIG. 5 the body 20 has an inlet means at 21 and an outlet means at 22. The mounting means 23 which is shown screwed to the top surface 24 of a dwang has a T-shaped slot 28 in it and the body has a downwardly depending T-shaped leg 26 which fits within the slot to enable relative sliding movement of the body 20 with respect to the mounting means 23, thus achieving the method of this invention.

Figure 6:
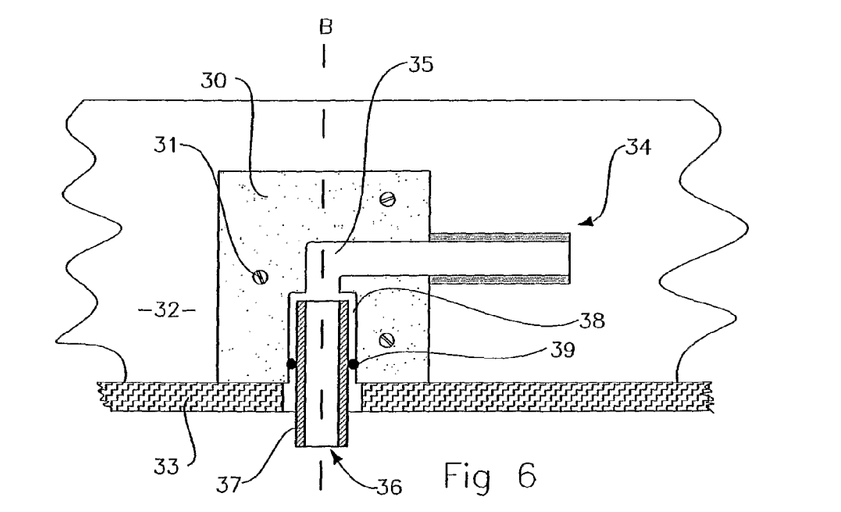

In FIG. 6, which shows, schematically, an entirely different construction, the body portion 30 is enabled to be secured to a structure by suitable mounting means which may just be holes for screws such as 31 to screw into the surface 32 of a dwang. The cladding applied to the structure is shown at 33. The inlet means 34 communicates via passage 35 with outlet means 36. The outlet means 36 is provided perhaps as a male thread on a, perhaps, mostly cylindrical tube 37 which is able to be slid in and out from the wall cladding 33 within a chamber 38 in the body portion. A seal 39 seals between the chamber 38 and the tube 37 to prevent leakage of fluid between the two. Thus the outlet means can be slid along the axis B-B to provide the desired adjustment. In this case the inlet means 34 always remains stationary.

Figure 7:
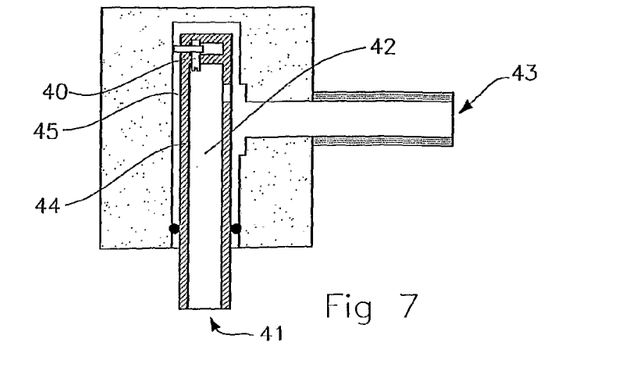

A means of locking a similar type of construction so that the outlet means can be rigidly secured in position in relation to the wall cladding is shown in schematic FIG. 7. There the head of a screw of a cam type locking device 40 is accessible through the outlet means 41 and part of the passage 42, communicating between the outlet means 41 and the inlet means 43. The camlock can be rotated to jam the cylinder 44 against the wall of the chamber 45 when the outlet means 41 is at the desired position. The camlock is flooded in use so that no special seals are required. This type of construction might be useful for say a wall-type kitchen sink bench tap where the method of the present invention was to be used, or perhaps a wall-type bath tap. In both cases it might be desirable for the tap to remain in position regardless of how hard it was pulled outwardly or rotated and the only means of securing the tap would be its threaded connection to the outlet means 4.

Figure 8:
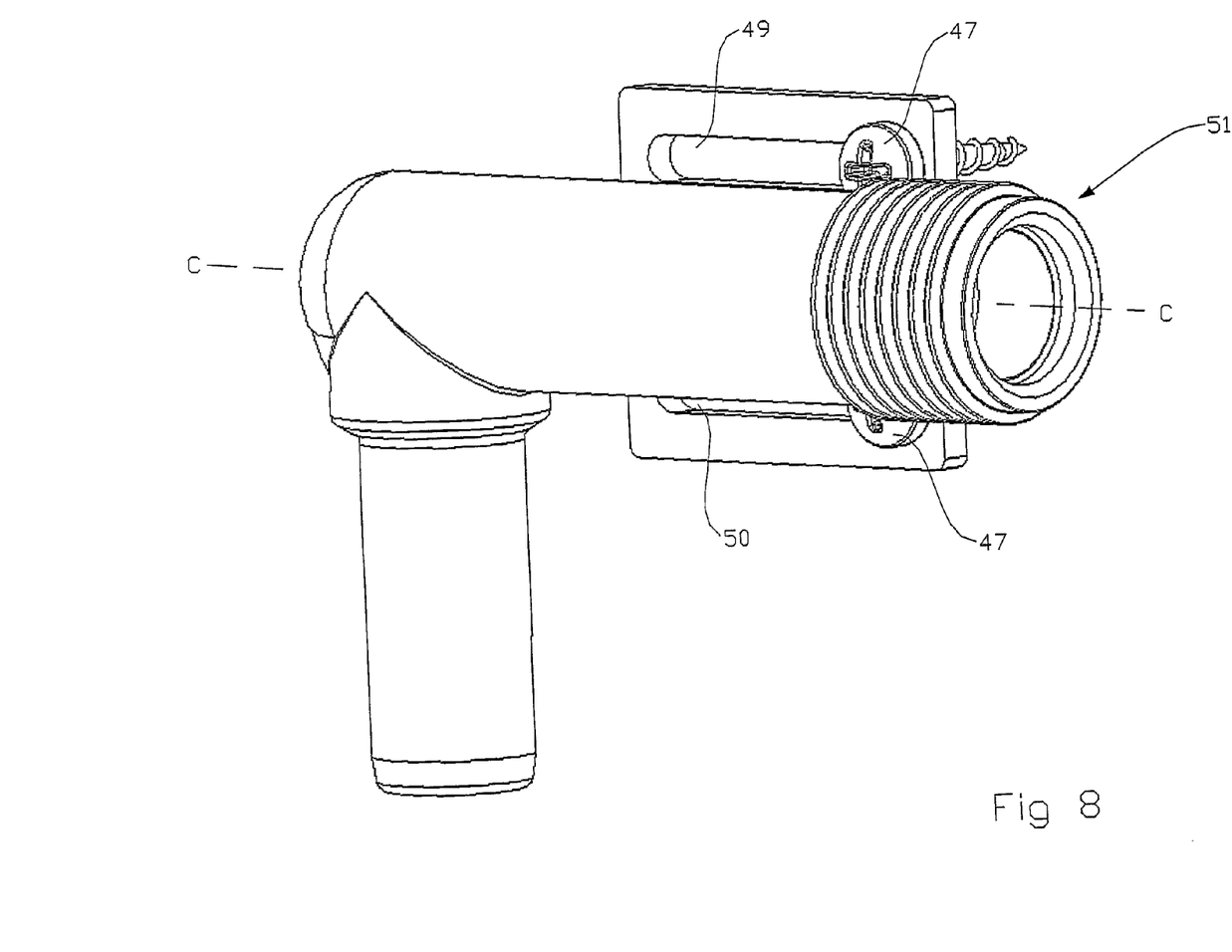
FIG. 8 shows another possible configuration for a fitting for use where the thickness of the wall cladding is known by the plumber and there is no need to provide for adjustment of the outlet position after the wall cladding has been attached.

In FIG. 8 the mounting means include screws 47 to fit in two parallel slots 49 and 50. The body portion 48 is able to be slid along the outlet means axis C-C and then secured in position to part of the structure such as a stud by screws 47. In this arrangement it is contemplated that the plumber would know exactly how far from the unclad face of the structure the outlet means 51 should project and would fasten the screws 47 within the slots 49 and 50 to achieve that result or the screws would not be fully tightened, allowing sliding of the body portion at any time. This type of fitting has obvious disadvantages compared to that shown in FIGS. 1 to 4 as it is not as versatile, but it does have the advantage of being cheaper to manufacture, being just one piece.

Figure 9:
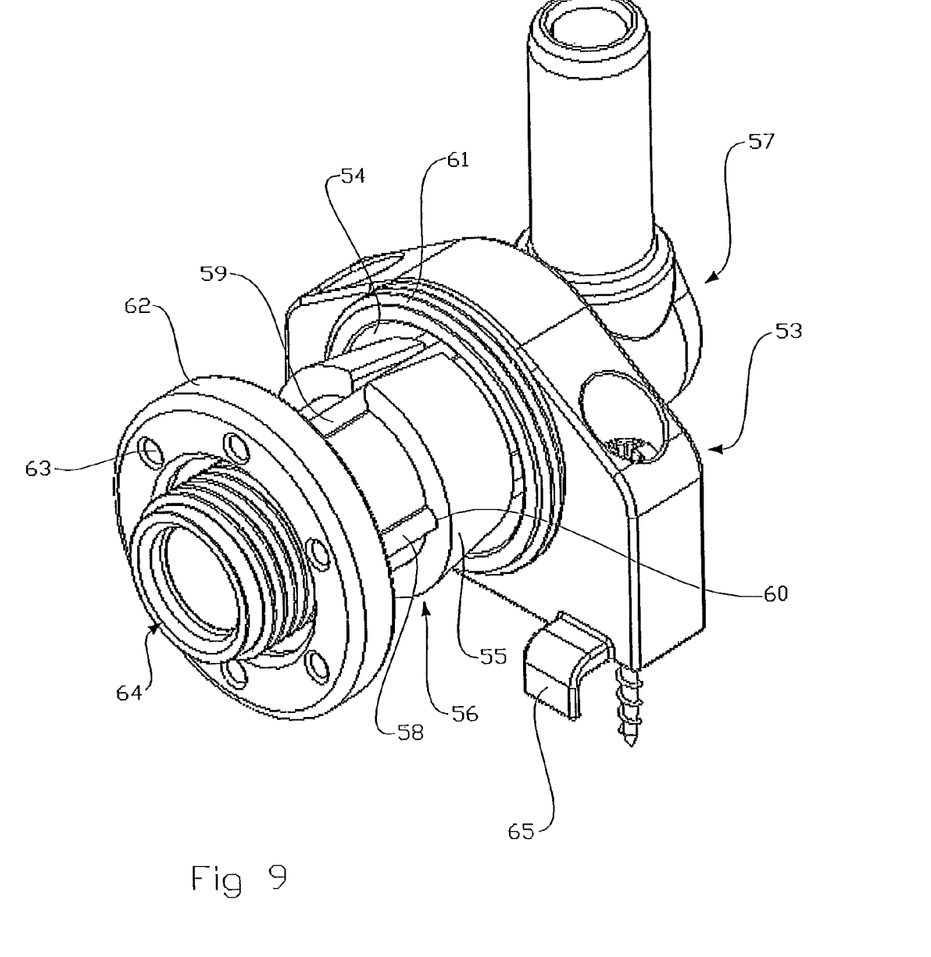
FIG. 9 shows another possible configuration for a fitting which includes a split collet.

FIG. 9 shows a fitting where the mounting means 53 has a frusto-conical internal face 54 adapted to mate with the frusto-conical external face 55 of a split collet 56.

The body 57 has in this case a number of lengthwise protrusions such as 58 and 59 which mate with corresponding recesses such as 60 in the split collet. The mounting means 53 additionally has a male threaded portion 61 which is adapted to mate with a female threaded portion of a locking ring 62 provided with suitable holes such as 63 to enable it to be turned with a suitable peg-type spanner. The degree of protrusion of the outlet means 64 from the mounting means 53 is adjusted by screwing the locking ring onto the threaded portion 61 to jam the split collet 56 inside the mounting means 53. The jamming action frictionally locks the faces 54 and 55 together, thus preventing relative rotation, while the body 57 is positively restrained with respect to the split collet by means of the longitudinal protrusions such as 58 mating with recesses such as 60. It is possible to arrange the fitting so that the outlet means projects through a hole which might be one of a series punched in a length of metal strip adapted to be fastened between two studs, enabling one or more fittings to be mounted side by side. The hole would be just wide enough to receive the male threaded portion 61 of the mounting means and rotation could be prevented by subsequently screwing the locking ring on to the metal strip through a couple of peg holes 63 or by having part of the mounting means 53 co-act with the strip such as a version of stops such as 65.

Figure 10:
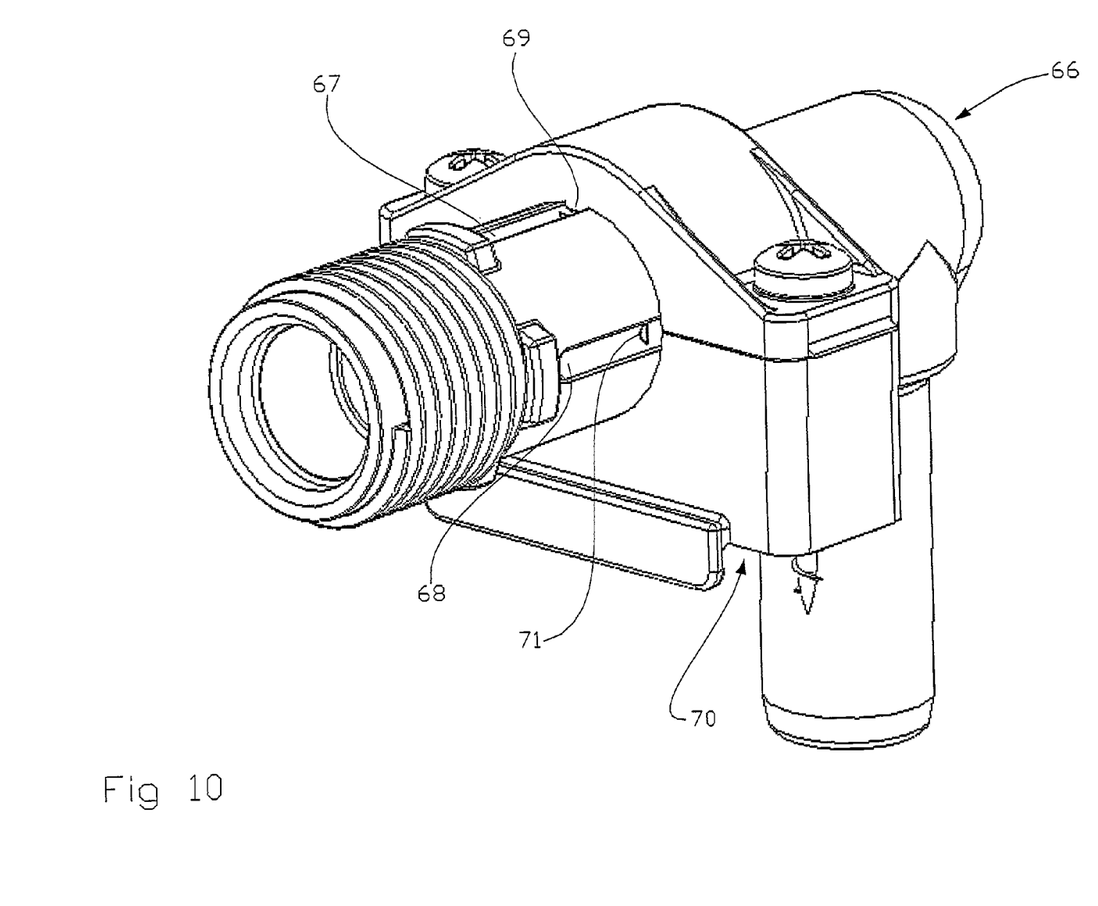
FIG. 10 shows another possible configuration of a fitting where the mounting means cap contains saw-tooth projections to co-act with a bridge or bridges across a groove or grooves in the body.

FIG. 10 shows another arrangement where the body 66 is provided with longitudinal recesses such as 67 and 68 which mate with corresponding protrusions such as 69 in the mounting means 70. Small ridges such as 71 might be provided within a recess such as 68 or 67 and these can co-act with slots such as 72 (FIG. 11) in a protrusion 69.

Figure 12:
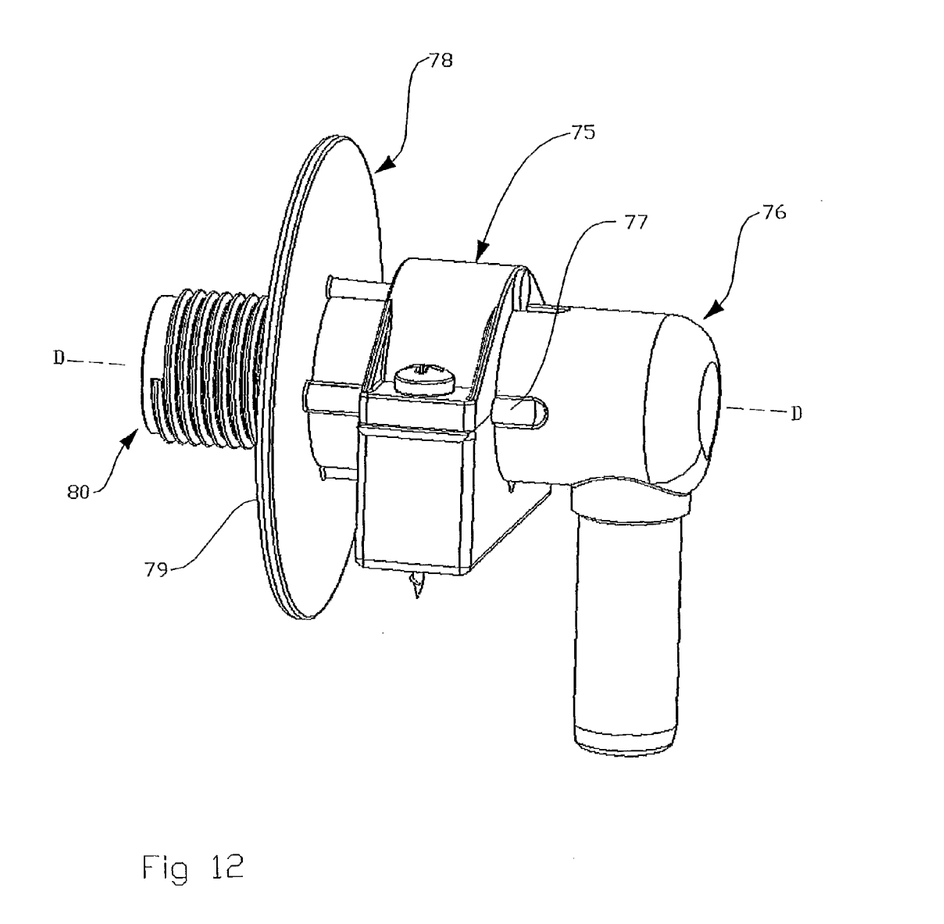
FIG. 12 shows another possible configuration of a fitting where the escutcheon or cover plate has legs or keys extending to lock the rotational position of the outlet with respect to the mounting means.

FIG. 12 shows a variation where both the mounting means 75 and the body 76 have longitudinal recesses in them. These are preferably semi-circular in cross section in each as shown by, for example, recess 77. An escutcheon or cover plate 78 has protruding legs or keys 79, in this case of circular cross section, which are adapted to co-act with the recesses such as 77 and lock the rotational position of the body 76 within the mounting means 75 while allowing axial movement along the axis D-D of the outlet means 80.

Figure 13:
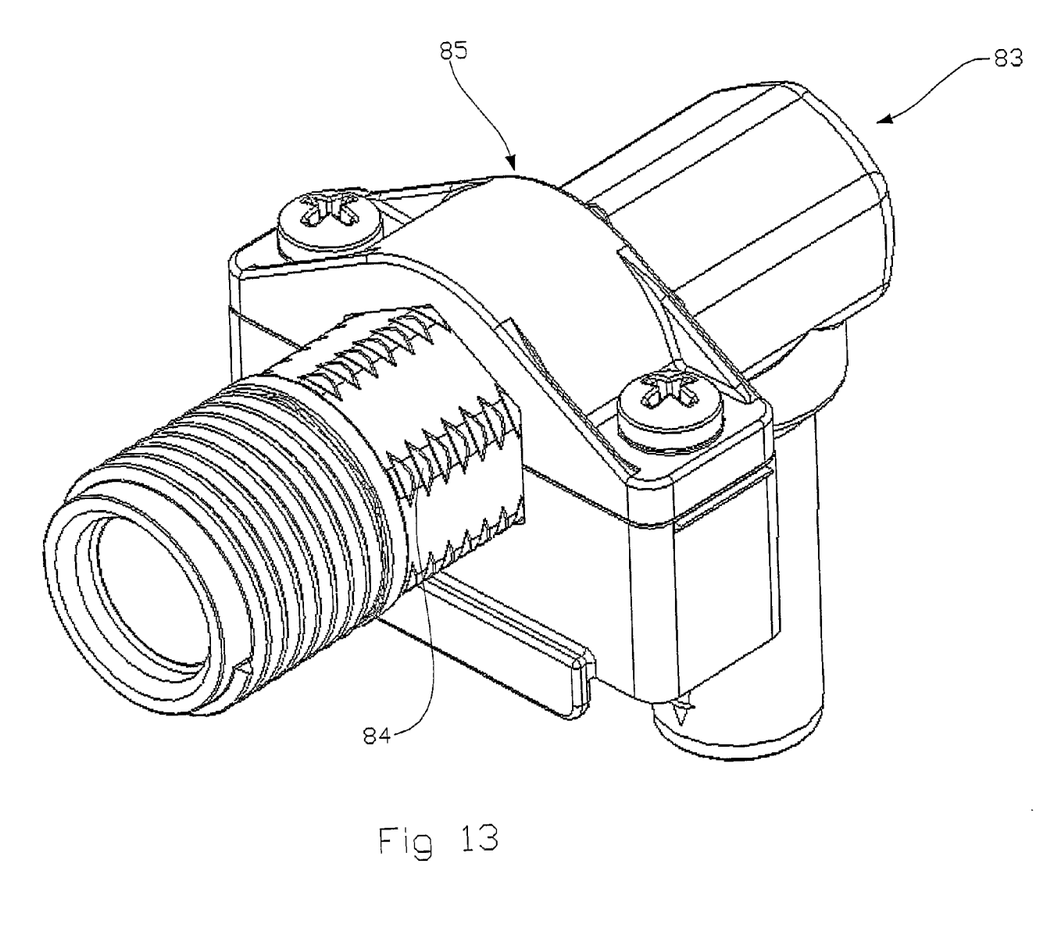
FIG. 13 shows another possible configuration of a fitting where the body could be metal, such as brass, co-acting with a mounting means of plastics.

FIG. 13 shows a fitting where the body 83 is designed to be made of metal such as brass. In FIG. 13 the body is shown as having a substantially hexagonal cross section and there are a number of slots such as 84 machined into the body for the purpose of co-acting with suitable restraining bridges within the mounting means 85.

Figure 14:
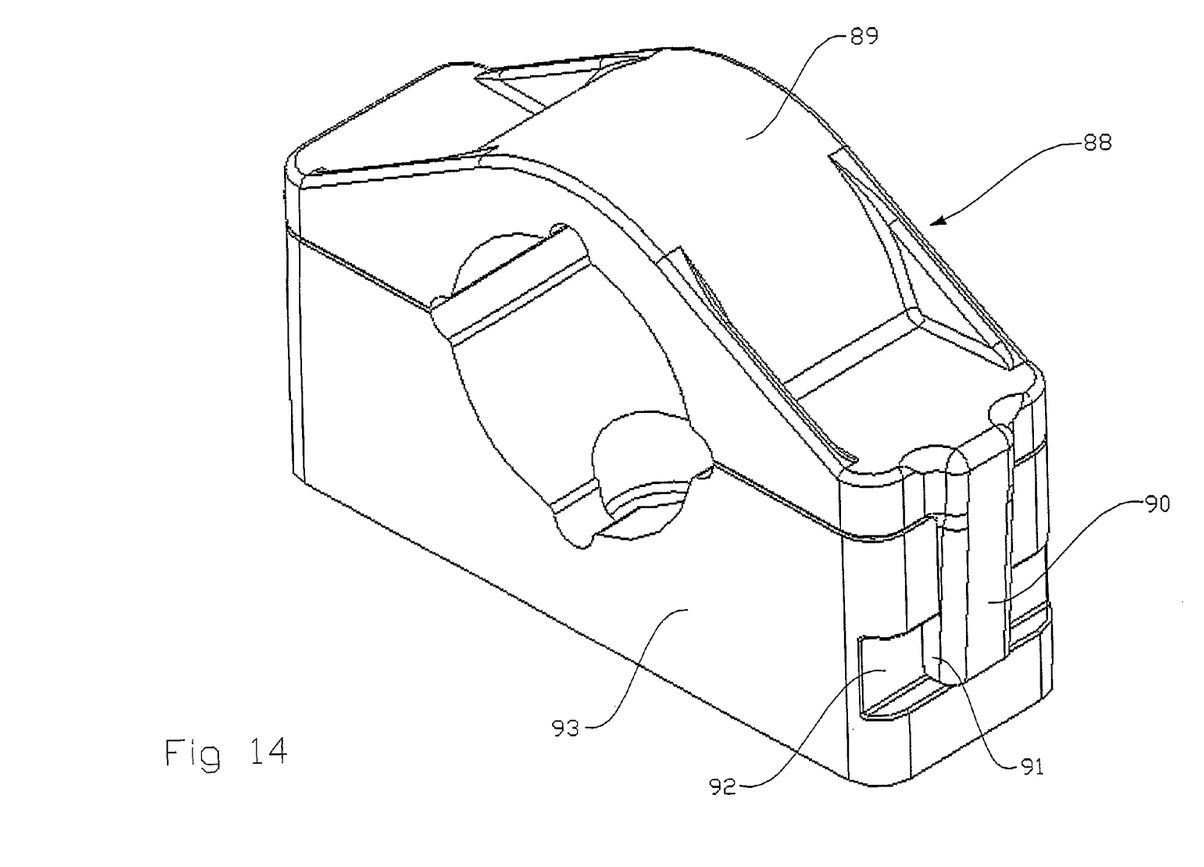
FIG. 14 shows a mounting means with a catch for the cap.

In FIG. 14 the mounting means 88 has an upper portion 89 provided with a catch arm 90 having a catch head 91 adapted to click-lock into a slot 92 formed in the lower portion 93 of the mounting means. This arrangement can be useful where only a single screw is needed to sufficiently hold the mounting means 88 to the structure.

Figure 15:
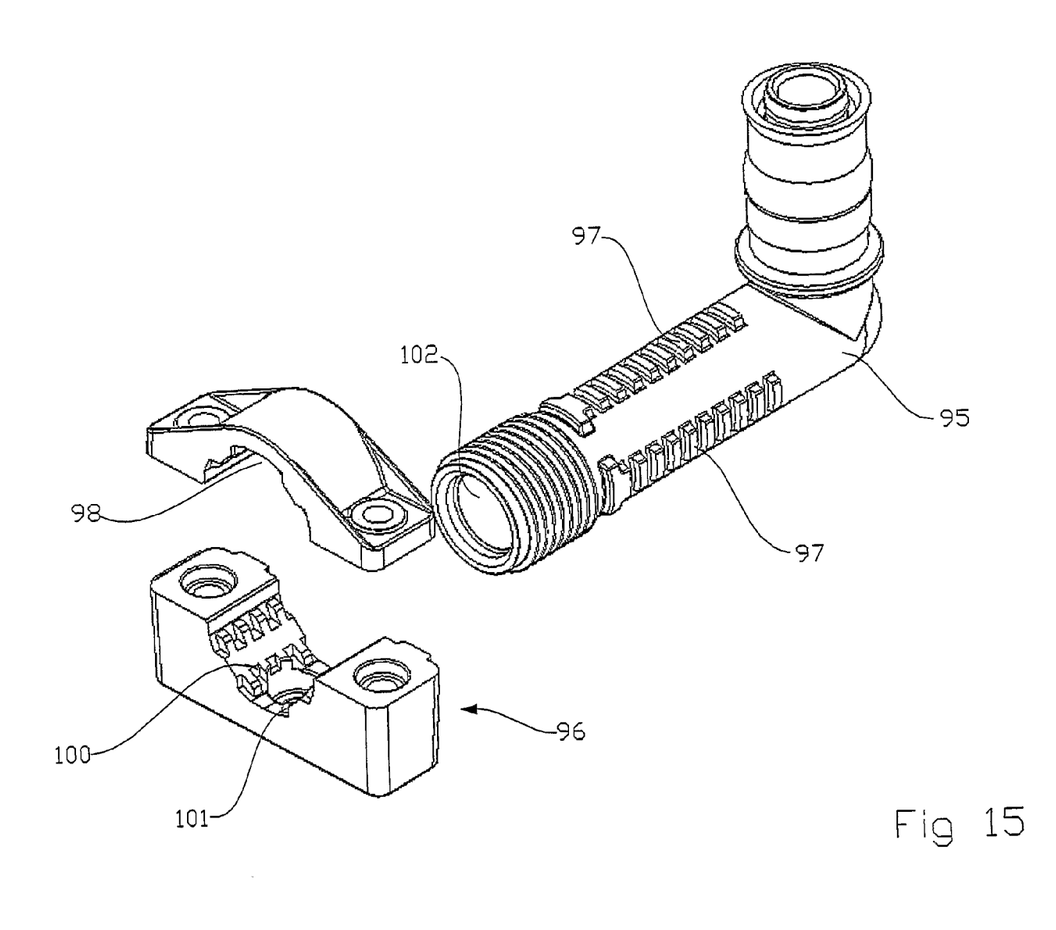
FIG. 15 shows an arrangement where the body is enabled for sliding and is able to be rotated to a locked non-sliding position.

FIG. 15 shows an arrangement allowing more positive locking of the body 95 to the mounting means 96. The body has a number of aligned projecting tongues 97. These collectively form a key or keys. A keyway such as 98 is provided in the mounting means 96 and on either side of the keyway are recesses such as 100 and 101 adapted to receive the tongues. Thus the tongues can be aligned with the keyways such that longitudinal movement of the body 95 with respect to the mounting means 96 is possible, but when the appropriate spacing of the outlet means 102 from the mounting means is achieved, the body is given a slight rotation so that the tongues engage with either the set of slots 100 on one side of the or each keyway or the set of slots on the other side. There might be a small click bridge which would resiliently co-act with the tongues 97 to give control over the axial movement of the body. There might be means at the outlet end of the body enabling a suitable amount of force to be used to cause interlocking of the tongues 97 with, or disengagement from, slots such as 100 and 101. For example there could be an internal hexagon formed within the outlet means 102 to receive an alien key to assist in rotating the body. This would probably be of limited use. Or, if a nut is tightened on to the outlet means then rotation of the nut might cause locking into one set of slots 100 or 101 depending on the direction of rotation of the nut. Only a slight rotation of the body 95 is required to achieve locking.

The tongues 97 also could be so shaped in conjunction with the shape of the slots 100 and 101 that they were self-selecting with any rotation imparted to the body causing easy interengagement. More desirable perhaps would be an arrangement where considerable force was necessary to cause disengagement so that the fitting would be useful to have a tap screwed directly to the outlet means 102 and held with the tap flange against the wall cladding and with the tap having a vertical orientation.

Of course the reverse structure is also possible when the key is provided on the mounting means and the keyway in the body.

| Reference: | Item: |
|---|---|
| FIGS. 1-4 | |
| 1 | Body |
| 2 | Mounting means |
| 3 | Inlet means |
| 4 | Outlet means |
| 5 | Face |
| 6 | Stops |
| 7 | key |
| 8 | Lower portion of mounting means |
| 9 | Upper portion of mounting means |
| 10 | Mounting hole |

-continued

Figure 11:
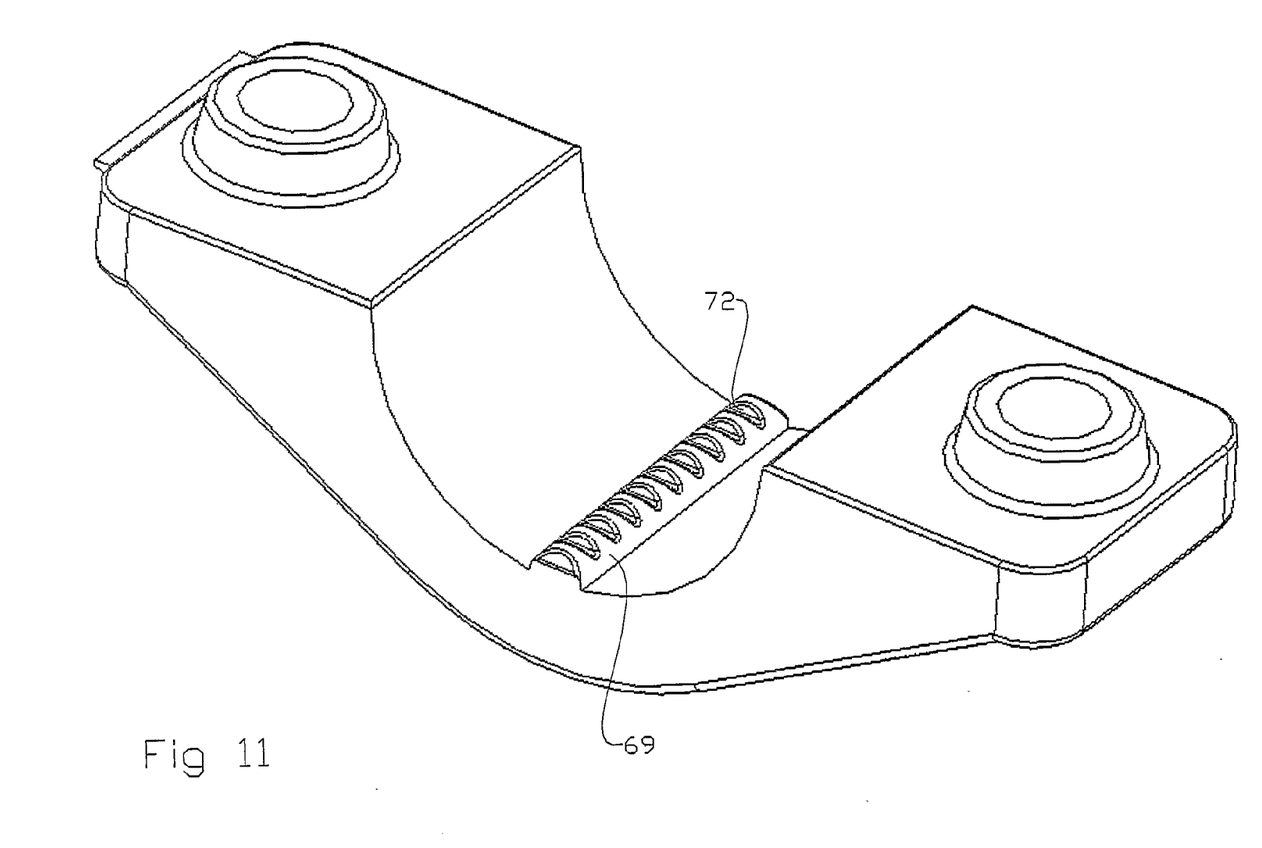
FIG. 11 shows a cap for use with the construction of FIG. 10.

| Reference: | Item: |
|---|---|
| 11 | Mounting hole |
| 12 | Stops |
| 13 | Narrow bridge |
| 14 | Hole |
| 15 | Hole |
| 16 | Catch |
| 17 | Catch |
| 18 | Catch |
| 19 | Serrations |
| | FIG. 5 |
| 20 | Body |
| 21 | Inlet means |
| 22 | Outlet means |
| 23 | Mounting means |
| 24 | Top surface of dwang |
| 25 | Mounting hole |
| 26 | T-shaped leg |
| 27 | keyways |
| 28 | T slot |
| 29 | |
| | FIG. 6 |
| 30 | Body |
| 31 | Screws |
| 32 | Surface of the dwang |
| 33 | Cladding applied to structure |
| 34 | Inlet means |
| 35 | Passage |
| 36 | Outlet means |
| 37 | Cylindrical tube |
| 38 | Chamber in the body |
| 39 | Seal |
| | FIG. 7 |
| 40 | Screw head of a cam type locking device |
| 41 | Outlet means |
| 42 | Passage |
| 43 | Inlet means |
| 44 | Cylinder |
| 45 | Chamber |
| | FIG. 8 |
| 47 | Screws |
| 48 | Body |
| 49 | Slot |
| 50 | Slot |
| 51 | Outlet means |
| | FIG. 9 |
| 53 | Mounting means |
| 54 | Internal face |
| 55 | External face of collet |
| 56 | Split collet |
| 57 | body |
| 58 | Lengthwise protrusion |
| 59 | Lengthwise protrusion |
| 60 | Recess |
| 61 | Threaded portion |
| 62 | Locking ring |
| 63 | Holes |
| 64 | Outlet means |
| 65 | Stop |
| | FIGS. 10 & 11 |
| 66 | Body |
| 67 | Longitudinal recess |
| 68 | Longitudinal recess |
| 69 | Protrusion |
| 70 | Mounting means |
| 71 | Bridge |
| 72 | Slot |
| | FIG. 12 |
| 75 | Mounting means |
| 76 | Body |
| 77 | Recess |
| 78 | Escutcheon/cover plate |

-continued

| Reference: | Item: |
|---|---|
| 79 | Legs/keys |
| 80 | Outlet means |
| | FIG. 13 |
| 83 | Body |
| 84 | Slot |
| 85 | Mounting means |
| | FIG. 14 |
| 88 | Mounting means |
| 89 | Upper portion |
| 90 | Catch arm |
| 91 | Catch head |
| 92 | Slot |
| 93 | Lower portion |
| | FIG. 15 |
| 95 | Body |
| 96 | Mounting means |
| 97 | Tongues |
| 98 | Keyway |
| 99 | |
| 100 | Recesses/slots |
| 101 | Recesses/slots |
| 102 | Outlet means |
| 103 | |

The invention claimed is:

1. A wingback plumbing fitting configured for use with a wall lining defining a plane, comprising:
    a hollow body portion having a first elongate portion and a second elongate portion,
    the hollow body having an inlet and an outlet for connection to plumbing pipes and other plumbing fittings,
    the first elongate portion having first elongate axis, and the second elongate portion having a second elongate axis, the two axes not being aligned with one another;
    a passage through the body linking the inlet to the outlet, to allow water to pass therethrough; and
    a mounting having an aperture therethrough defining an aperture axis, the mounting being configured for securing the hollow body to a structure which would, in use, be covered by the wall lining, so that the first elongate axis coincides with or is parallel to the aperture axis,
    the mounting having fastener apertures to allow the mounting to be secured to the structure so that the aperture axis can be perpendicular to the plane of the wall lining,
    the cross section of the first elongate portion and the cross section of the aperture are of comparable size so that the first elongate portion is a friction fit within the aperture when the mounting secures the first elongate portion in place, and
    wherein the exterior of the first elongate portion and the interior of the aperture have non-circular cross sections, and
    wherein the exterior cross section of the first elongate portion is complementary to the non-circular internal cross sectional shape of the aperture to allow limited longitudinal relative sliding movement of the first elongate portion in both longitudinal directions relative to the mounting and, at the same time, preventing rotational movement of the first elongate portion relative to the mounting.

2. A plumbing fitting as claimed in claim 1, wherein,
    a first one of i) the exterior of the first elongate portion and ii) the interior of the aperture, has at least one key on a surface thereof, and a second one of the i) the exterior of the first elongate portion and ii) the interior of the aperture, has at least one complementary keyway to prevent relative rotation of the first elongate portion relative to the mounting while at the same time allowing longitudinal movement along the first axis in either direction so that the first elongate portion can be both pulled and pushed with respect to the wall lining.

3. A plumbing fitting as claimed in claim 2, wherein the at least one key is transversely serrated and the at least one keyway has a transverse catch adapted to catch in the trough of a serration to restrain said axial sliding movement and there is inbuilt resilience allowing the catch to be overcome on sufficient hand pressure or tension being applied to cause the relative sliding movement between the first elongate portion and the mounting.

4. A plumbing fitting as claimed in claim 3, wherein the at least one key is provided along at least part of the length of the exterior of the first elongate portion.

5. A plumbing fitting as claimed in claim 4, wherein there are two of said at least one key along at least part of the length of the first elongate portion.

6. A plumbing fitting as claimed in claim 2, wherein a small degree of relative rotation between the body and the mounting causes locking of the at least one key in the at least one keyway.

7. A plumbing fitting as claimed in claim 2, wherein the interior surface of the aperture of the mounting has at least one key each of which can slide in a respective keyway in the exterior surface of the first elongate portion of the hollow body to allow relative sliding movement of the hollow body with respect to the mounting.

8. A plumbing fitting as claimed in claim 2, wherein the mounting has a lower portion and a removable upper portion which together define the aperture.

9. A plumbing fitting as claimed in claim 2, wherein,
said hollow body portion comprises an elbow portion positioned so that an axis of said inlet part is orthogonal to the axis of said outlet part,
said mounting portion is adapted to hold the body portion, the mounting part itself is secured to a horizontal support, and
said outlet part comprises i) an external male thread, and ii) an internal chamfer adapted to mate with a sealing rib of a cap.

10. A method of providing an outlet from a distributor to a wingback plumbing fitting of the type claimed in claim 1 secured in a structure, the method comprising the steps of:
(a) securing the distributor to an inlet provided on a body of a plumbing fitting,
(b) securing the body to the structure, and
(c) slidably adjusting an outlet part of the body by movement of at least the outlet part along an axis of the outlet part so that the outlet part projects, or will project, a desired distance from the structure, the outlet part being slidable along said axis towards and away from the structure, and
(d) at a final position of the outlet part, restraining the outlet part from substantially rotating with respect to the structure in at least its final position, wherein at the final position of the outlet part, the outlet part is restrained from relative rotation in at least one direction about the axis of the body part, wherein steps (a), (b), and (c) are executed in any order and step (d) is executed not prior to step (b).

11. A method of providing an outlet from a distributor to a wingback plumbing fitting as claimed in claim 1 secured in a structure, the method comprising the steps of:
(a) securing the distributor to an inlet provided on a body of the wingback plumbing fitting,
(b) suitably securing the body to the structure, and
(c) slidably adjusting an outlet part of the body by movement of at least the outlet part along the outlet an axis of the output part so that the outlet part projects a greater distance from the structure than is required for a final position of the outlet part, the outlet part being slidable along said axis towards and away from the structure, and
(d) at a final position of the outlet part, attaching an item to the outlet, and after attaching the item to the outlet, pushing the outlet part closer to the structure into the final position of the outlet part,
wherein steps (a), (b), and (c) are executed in any order.

12. A plumbing fitting comprising:
an elongated hollow body portion having an external surface;
a mounting part having an internal surface defined by an aperture;
an inlet part of said body portion;
an outlet part of said body portion, said outlet part having an axis in a longitudinal direction; and
a passage through said body linking the inlet part to the outlet part, wherein,
the external surface of the body portion comprises at least one elongated feature extending in a plane that is parallel to the said axis,
the at least one elongated feature covers only a portion of the external surface of the mounting part,
the internal surface of the aperture of the mounting part comprises at least one another elongated feature also extending in a plane that is parallel to the said axis and covering only a portion of the internal surface of the mounting part,
the number of the elongated feature(s) on the external surface of the body is same as the number of the elongated feature(s) on the internal surface of the mounting part, and
the body portion being slidably mounted to the mounting part on said aperture along said axis and said at least one elongated feature(s) of said exterior of the body portion being in a physical engagement with said at least one elongated feature(s) of the interior of the mounting part thereby restraining the relative rotation in either direction of the body portion about the said axis.

13. A plumbing fitting as claimed in claim 12, wherein said at least one elongated feature covering only a portion of said external surface of the body portion is in the form of recess.

14. A plumbing fitting as claimed in claim 12, wherein said at least one elongated feature covering only a portion of said internal surface of the mounting part is in the form of recess.

15. A plumbing fitting as claimed in claim 14, wherein said at least one elongated feature covering only a portion of said external surface of the body portion comprises at least one protrusion.

16. A plumbing fitting as claimed in claim 14, wherein the recess is a keyway.

17. A plumbing fitting as claimed in claim 16, wherein the protrusion is a key which can slide in a keyway in the mounting part to allow relative sliding movement of the body portion with respect to the mounting part.

18. A plumbing fitting as claimed in claim 17, wherein a small degree of relative rotation between the body and the mounting part causes locking of the key in the keyway.

19. A plumbing fitting as claimed in claim 17, wherein the key is transversely serrated and the keyway has a transverse catch adapted to catch in the trough of a serration to restrain the axial sliding movement and therein inbuilt resilience thereby being adapted to cause the catch to overcome any hand pressure or tension that is applied and cause relative sliding movement between the body portion and mounting part.

20. A plumbing fitting as claimed in claim 19, wherein,
said body portion comprises an elbow portion positioned so that an axis of said inlet part is orthogonal to the axis of said outlet part,
said mounting part is adapted to hold the body portion and the mounting part itself secured to the horizontal support, and
said outlet part comprises (i) an external male thread, and (ii) an internal chamfer adapted to mate with a sealing rib of a cap.

21. A plumbing fitting as claimed in claim 19, wherein,
said mounting part is adapted to hold the body portion and the mounting part is itself secured to a horizontal support, and
said outlet part comprises (i) an external male thread, and (ii) an internal chamfer adapted to mate with a sealing rib of a cap.

22. A plumbing fitting as claimed in claim 12, wherein said at least one elongated feature covering only a portion of said internal surface of the mounting part comprises at least one protrusion.

23. A plumbing fitting as claimed in claim 12, wherein said at least one elongated feature covering only a portion of said external surface of the body portion is in the form of recess and a said at least one elongated feature covering only a portion of said internal surface of the mounting part comprises at least one protrusion.

24. A plumbing fitting as claimed in claim 12, wherein,
said at least one elongated feature covering only a portion of said external surface of the body portion comprises at least one protrusion, and
said at least one elongated feature covering only a portion of said internal surface of the mounting part is in the form of recess.

25. A plumbing fitting as claimed in claim 12, wherein the mounting part frictionally co-acts with the body in an amount to allow hand pressure or tension to cause relative sliding between them in use but otherwise the relative position of the body portion and the mounting part remains fixed.

* * * * *

UNITED STATES PATENT AND TRADEMARK OFFICE
CERTIFICATE OF CORRECTION

PATENT NO.       : 8,667,994 B2                                    Page 1 of 1
APPLICATION NO.  : 11/794103
DATED            : March 11, 2014
INVENTOR(S)      : David John Picton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1873 days.

Signed and Sealed this

Twenty-ninth Day of September, 2015

Michelle K. Lee
*Director of the United States Patent and Trademark Office*